United States Patent
Park et al.

(10) Patent No.: US 9,918,278 B2
(45) Date of Patent: Mar. 13, 2018

(54) METHOD AND APPARATUS FOR OPERATING BASED ON POWER SAVE MODE IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 35 days.

(21) Appl. No.: 15/108,768

(22) PCT Filed: Jan. 12, 2015

(86) PCT No.: PCT/KR2015/000288
§ 371 (c)(1),
(2) Date: Jun. 28, 2016

(87) PCT Pub. No.: WO2015/105390
PCT Pub. Date: Jul. 16, 2015

(65) Prior Publication Data
US 2016/0330689 A1  Nov. 10, 2016

Related U.S. Application Data

(60) Provisional application No. 61/925,650, filed on Jan. 10, 2014, provisional application No. 62/081,479, filed on Nov. 18, 2014.

(51) Int. Cl.
*H04W 52/02* (2009.01)
*H04W 84/12* (2009.01)

(52) U.S. Cl.
CPC ... *H04W 52/0235* (2013.01); *H04W 52/0216* (2013.01); *H04W 84/12* (2013.01); *Y02B 60/50* (2013.01)

(58) Field of Classification Search
CPC ......... H04W 52/0235; H04W 52/0216; H04W 52/0209; H04W 84/12; Y02B 60/50
See application file for complete search history.

(56) References Cited

U.S. PATENT DOCUMENTS

| 5,371,734 A * | 12/1994 | Fischer ............. H04W 52/0274 370/311 |
| 9,635,705 B2 * | 4/2017 | Lu .......................... H04W 84/00 |
| 2005/0249227 A1 * | 11/2005 | Wang ..................... H04L 47/10 370/412 |

FOREIGN PATENT DOCUMENTS

| JP | 2012085329 | 4/2012 |
| KR | 20040104776 | 12/2004 |

(Continued)

OTHER PUBLICATIONS

PCT International Application No. PCT/KR2015/000288, International Search Report dated Mar. 23, 2015, 2 pages.

(Continued)

*Primary Examiner* — Wei Zhao
(74) *Attorney, Agent, or Firm* — Lee, Hong, Degerman, Kang & Waimey PC

(57) ABSTRACT

Disclosed are a method and an apparatus for operating based on a power save mode in a wireless LAN. The method for operating based on the power save mode in a wireless LAN may comprise the steps of: an STA receiving, from an AP, a beacon frame from a beacon frame time resource for the beacon frame, wherein a TIM included in the beacon frame indicates pending downlink data for the STA; the STA maintaining a sleep mode after receiving the beacon frame and until a monitoring start time resource for the downlink frame for delivering downlink data; and the STA receiving, from the AP, the downlink frame from a listen window including the monitoring start time resource.

10 Claims, 14 Drawing Sheets

(56) References Cited

FOREIGN PATENT DOCUMENTS

| KR | 20110077726 | 7/2011 |
| KR | 1020130139761 | 12/2013 |
| KR | 1020130142947 | 12/2013 |
| WO | 2012165733 | 12/2012 |

OTHER PUBLICATIONS

Korean Intellectual Property Office Application No. 10-2016-7015341, Notice of Allowance dated Dec. 13, 2017, 2 pages.

\* cited by examiner

FIG. 1
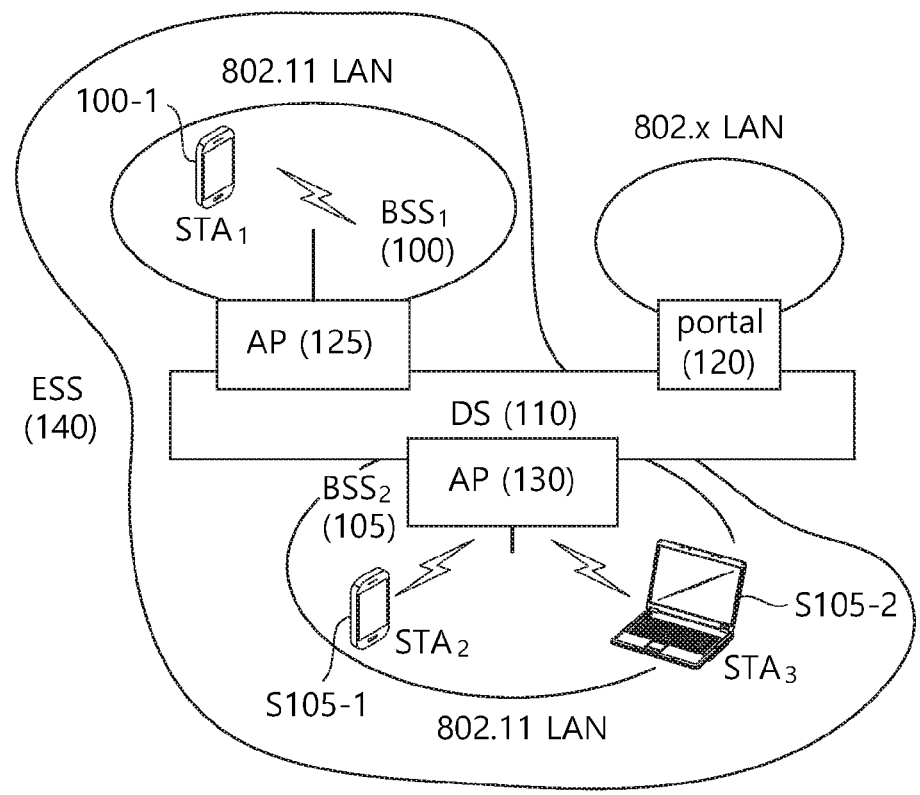
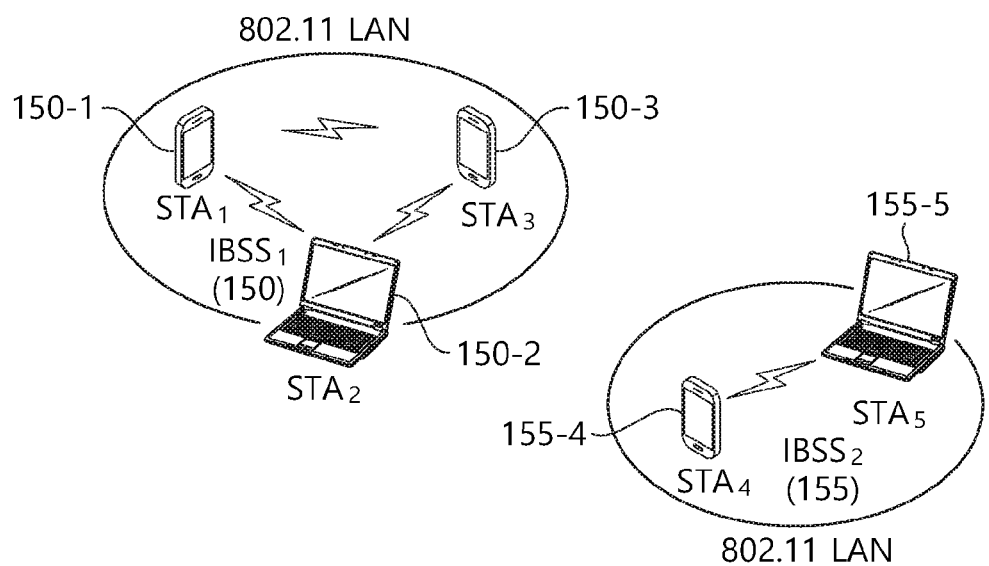

METHOD AND APPARATUS FOR OPERATING BASED ON POWER SAVE MODE IN WIRELESS LAN

CROSS-REFERENCE TO RELATED APPLICATIONS

This application is the National Stage filing under 35 U.S.C. 371 of International Application No. PCT/KR2015/000288, filed on Jan. 12, 2015, which claims the benefit of U.S. Provisional Application Nos. 61/925,650, filed on Jan. 10, 2014 and 62/081,479, filed on Nov. 18, 2014, the contents of which are all hereby incorporated by reference herein in their entirety.

BACKGROUND OF THE INVENTION

Field of the Invention

The present invention relates to wireless communications, and more particularly, to a method and an apparatus for an operation based on a power saving mode in a wireless local area network (WLAN).

Related Art

In IEEE 802.11, a power saving mechanism (or power saving mode) may be used to increase the life of a wireless local area network (WLAN) station (STA). An STA operating based on the power saving mode is capable of operating in an awake state or doze state in order to save power. The awake state is a state in which normal operations of the STA, such as frame transmission or reception or channel scanning, are possible. The doze state is a state in which power consumption is drastically reduced to make it impossible to transmit or receive a frame and to perform channel scanning. The STA operating in the power saving mode is usually in the doze state and switches to the awake state if necessary to reduce power consumption.

When the STA is operating for a long time in the doze state, power consumption of the STA is reduced. Accordingly, the life of the STA may increase. However, in the doze state, it is impossible to transmit or receive a frame. Thus, the STA may not stay for a long time in the doze state. When the STA has a pending frame in the doze state, the STA may switch to the awake state to transmit the frame to an AP. However, when the STA is in the doze state and the AP has a pending frame to transmit to the STA, the STA may not receive the pending frame from the AP and does not recognize that the AP has the pending frame. Accordingly, the STA may periodically switch to the awake mode to operate in order to acquire information on whether the AP has a pending frame and to receive the pending frame from the AP.

The AP may acquire information on an awake-mode operation timing of the STA and transmit information on whether the AP has a pending frame according to the awake-mode operation timing of the STA.

Specifically, the STA in the doze state may periodically switch from the doze state to the awake state to receive a beacon signal in order to receive information on whether there is a frame to receive from the AP. The AP may notify whether there is a frame to transmit to each STA based on a traffic indication map (TIM) included in the beacon frame. The TIM may be used to indicate the presence of a unicast frame to be transmitted to the STA, and a delivery traffic indication map (DTIM) may be used to indicate the presence of a multicast frame/broadcast frame to be transmitted to the STA.

SUMMARY OF THE INVENTION

An aspect of the present invention is to provide an operation method based on a power saving mode in a wireless local area network (WLAN).

Another aspect of the present invention is to provide an operation apparatus based on a power saving mode in a WLAN.

To achieve the aforementioned purposes of the present invention, an operation method based on a power saving mode in a WLAN according to one aspect of the present invention may include receiving, by a station (STA), a beacon frame from an access point (AP) on a beacon frame time resource for the beacon frame, a time indication map (TIM) included in the beacon frame indicating pending downlink data for the STA, maintaining, by the STA, a sleep mode until a monitoring start time resource for a downlink frame carrying the downlink data after receiving the beacon frame, and receiving, by the STA, the downlink frame from the AP in a listen window comprising the monitoring start time resource, wherein the monitoring start time resource may be determined based on an identifier indicating the beacon frame time resource and a length of the listen window, and the listen window may be a downlink frame monitoring period of the STA.

To achieve the aforementioned purposes of the present invention, an STA operating based on a power saving mode in a WLAN according to another aspect of the present invention may include a radio frequency (RF) unit configured to transmit or receive a radio signal and a processor operatively connected to the RF unit, wherein the processor may be configured to receive a beacon frame from an AP on a beacon frame time resource for the beacon frame, to maintain a sleep mode until a monitoring start time resource for a downlink frame carrying downlink data after receiving the beacon frame, and to receive the downlink frame from the AP in a listen window comprising the monitoring start time resource, a time indication map (TIM) included in the beacon frame may indicate the downlink data, the monitoring start time resource may be determined based on an identifier indicating the beacon frame time resource and a length of the listen window, and the listen window may be a downlink frame monitoring period of the STA.

An STA operating in the power saving mode may switch to an awake state only at a particular timing without transmitting a power save poll (PS-Poll) frame to receive pending downlink data from an AP. Thus, signaling overhead for transmission of a PS-Poll frame and a transmission delay may be reduced.

BRIEF DESCRIPTION OF THE DRAWINGS

FIG. 1 is a conceptual view illustrating a structure of a wireless local area network (WLAN).

DESCRIPTION OF EXEMPLARY EMBODIMENTS

Figure 2:
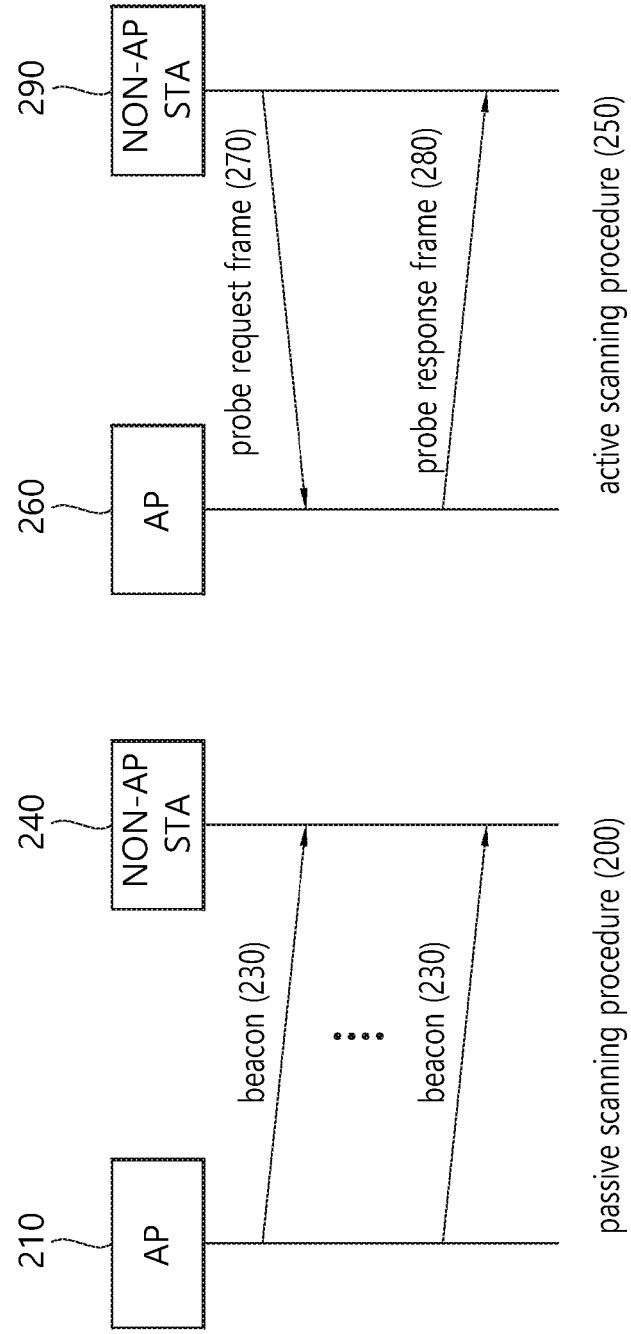
FIG. 2 is a conceptual view illustrating a scanning method in a WLAN.

FIG. 1 is a conceptual view illustrating a structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

In the following embodiments of the present invention, data (or a frame) transmitted from an AP to an STA may be represented by downlink data (or a downlink frame) and data (or a frame) transmitted from an STA to an AP may be represented by uplink data (or an uplink frame). Also, transmission from an AP to an STA may be represented by downlink transmission and transmission from an STA to an AP may be represented by uplink transmission.

FIG. 2 is a conceptual view illustrating a scanning method in a WLAN.

Referring to FIG. 2, scanning methods may be classified into passive scanning 200 and active scanning 250.

Referring to a left part of FIG. 2, passive scanning 200 may be performed by a beacon frame 230 periodically broadcast by an AP 200. The AP 200 of a WLAN broadcasts the beacon frame 230 to a non-AP STA 240 in each specific period (for example, every 100 msec). The beacon frame 230 may include information on the current network. The non-AP STA 240 receives the periodically broadcast beacon frame 230 to receive the information on the network and to scan a channel to the AP 210 with which an authentication/association process is performed.

In passive scanning 200, the non-AP STA 240 only needs to receive the beacon frame 230 transmitted from the AP 210, without transmitting a frame. Thus, passive scanning 200 has low overall overhead of data transmission/reception in the network. However, since scanning is only passively performed in proportion to the period of the beacon frame 230, it takes a relatively longer time to perform passive scanning than active scanning. A beacon frame is described in detail in 8.3.3.2. Beacon Frame of "IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter "IEEE 802.11")," IEEE Draft P802.11-REVmb™/D12, November 2011. In IEEE 802.11 ai, a beacon frame in a different format may further be used, which may be referred to as a fast initial link setup (FILS) beacon frame. In addition, a measurement pilot frame, which is a frame including only some information on a beacon frame, may be used in a scanning procedure. The measurement pilot frame is disclosed in 8.5.8.3 Measurement Pilot Format of IEEE 802.11.

Further, an FILS discovery frame may be defined. An FILS discovery frame is a frame transmitted by each AP in between beacon frame transmission periods, which may be transmitted at shorter intervals than the beacon frame. That is, the FILS discovery frame is a frame transmitted by shorter periods than the beacon frame. The FILS discovery frame may include identifier information (SSID or BSSID) on the AP transmitting the discovery frame. The FILS discovery frame is transmitted before the beacon frame is transmitted to an STA, allowing the STA to discover in advance the presence of the AP in a corresponding channel. An interval at which one AP transmits an FILS discovery frame is defined as an FILS discovery frame transmission interval. The FILS discovery frame may be transmitted, including part of information included in the beacon frame.

Referring to a right part of FIG. 2, in active scanning 250, a non-AP STA 290 may transmit a probe request frame 270 to an AP 260 to proactively perform scanning.

The AP 260 may receive the probe request frame 270 from the non-AP STA 290, wait for a random time to prevent a frame collision, and transmit a probe response frame 280 including network information to the non-AP STA 290. The non-AP STA 290 may obtain the network information based on the received probe response frame 280 and stop a scanning process.

Active scanning 250 takes a short time since the non-STA 290 proactively performs scanning. However, since the non-AP STA 290 needs to transmit the probe request frame 270, active scanning 250 involves an increase in network overhead for frame transmission and reception. The probe request frame 270 is disclosed in section 8.3.3.9 of IEEE 802.11, and the probe response frame 280 is disclosed in section 8.3.3.10 of IEEE 802.11.

When scanning is finished, the AP and the non-AP STA may perform authentication and association procedures.

Figure 3:
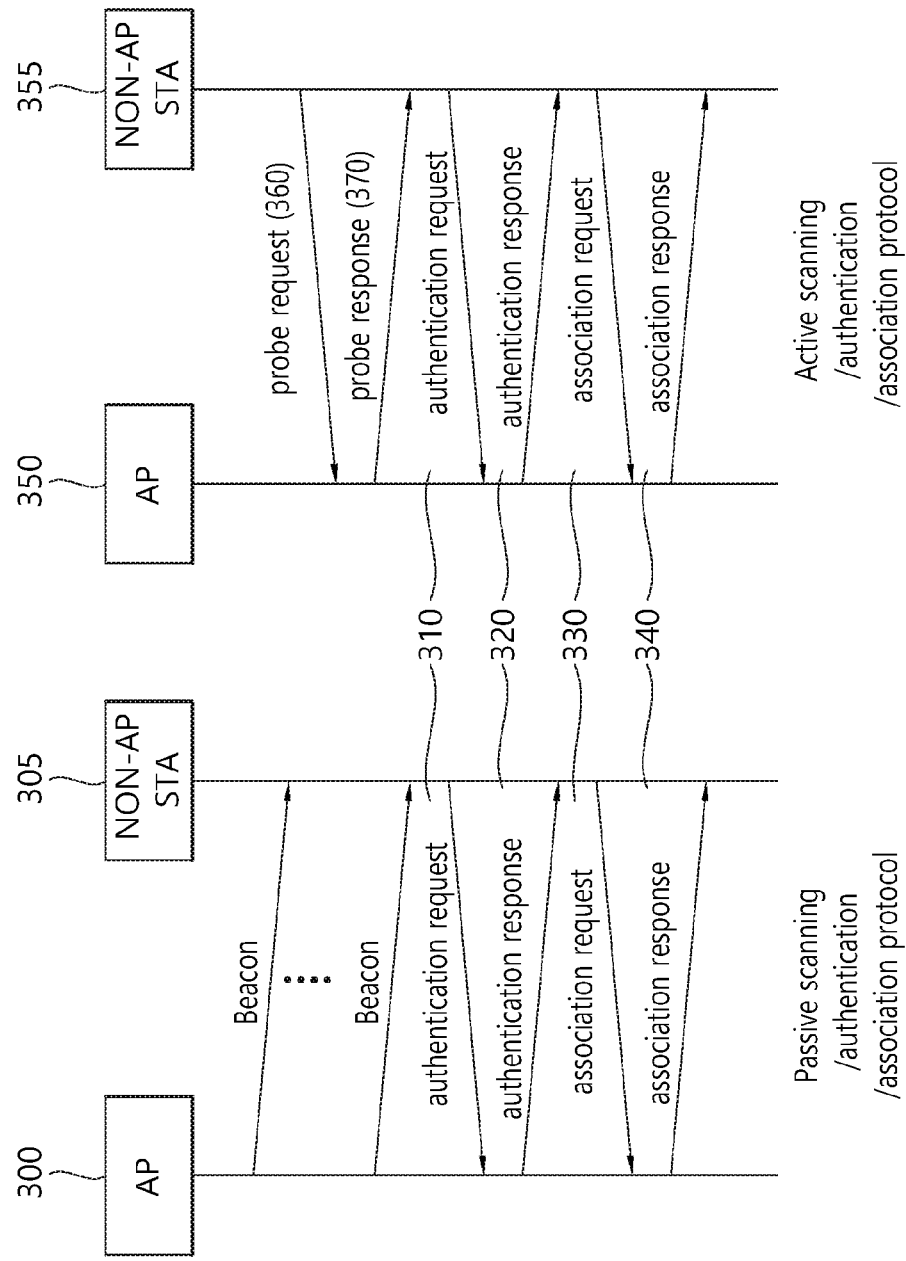
FIG. 3 is a conceptual view illustrating an authentication procedure and an association procedure which are performed between an AP and an STA after a scanning procedure.

FIG. 3 is a conceptual view illustrating an authentication procedure and an association procedure which are performed between an AP and an STA after a scanning procedure.

Referring to FIG. 3, after passive/active scanning is performed, an authentication procedure and an association procedure with one of scanned APs may be performed.

The authentication procedure and the association procedure may be performed, for example, through two-way handshaking. A left part of FIG. 3 is a conceptual view illustrating authentication and association procedures after passive scanning, and a right part of FIG. 3 is a conceptual view illustrating authentication and association procedures after active scanning.

The authentication procedure and the association procedure may be performed in the same manner regardless of whether active scanning or passive scanning is used by exchanging an authentication request frame 310/authentication response frame 320 and an association request frame 330/association response frame 340 between an AP 300 and 350 and a non-AP STA 305 and 355.

In the authentication procedure, the non-AP STA 305 and 355 may transmit the authentication request frame 310 to the AP 300 and 350. The AP 300 and 350 may transmit the authentication response frame 320 to the non-AP STA 305 and 350 in response to the authentication request frame 310. An authentication frame format is disclosed in 8.3.3.11 of IEEE 802.11.

In the association procedure, the non-AP STA 305 and 355 may transmit the association request frame 330 to the AP 300 and 305. The AP 305 and 355 may transmit the association response frame 340 to the non-AP STA 300 and 350 in response to the association request frame 330. The association request frame 330 transmitted to the AP includes information on capability of the non-AP STA 305 and 355. The AP 300 and 350 may determine whether it is possible to support the non-AP STA 305 and 355 based on the information on the capability of the non-AP STA 305 and 355.

When it is possible to support the non-AP STA 305 and 355, the AP 300 and 350 may transmit the association response frame 340 to the non-AP STA 305 and 355. The association response frame 340 may include information on whether to accept the association request frame 340, a reason for acceptance, and information on capability supportable by the AP. An association frame format is disclosed in 8.3.3.5/ 8.3.3.6 of IEEE 802.11.

When the association procedure is achieved between the AP and the non-AP STA, data transmission and reception may normally be performed between the AP and the non-AP STA. When the association procedure between the AP and the non-AP STA fails, the association procedure with the AP is performed in view of a reason for failure of the association or an association procedure with another AP may be performed.

When the STA is associated with the AP, the STA may be assigned an association identifier (AID) by the AP. The AID assigned to the STA may be a unique value in one BSS and currently be one of 1 to 2007. Since 14 bits are assigned for an AID, up to 16383 may be used as an AID value, while values from 2008 to 16383 are reserved.

A power saving mechanism is provided in IEEE 802.11 in order to increase the life of an STA in a WLAN.

For power saving, an STA may operate based on two modes (or states), an active mode (awake state) and a sleep mode (doze state). The STA may operate in a power saving mode based on an awake state or doze state.

The STA in the active mode (or awake state) may perform a normal operation, such as frame transmission or reception and channel scanning. The STA in the sleep mode (doze state) neither transmits or receives a frame nor performs channel scanning in order to reduce power consumption. The STA operating in the power saving mode maintains the doze state in order to reduce power consumption and switches (or transitions) to the awake state to communicate with an AP if necessary.

As the STA maintains the doze state for a longer time, the power consumption of the STA may decrease whereas the life of the STA may increase. In the doze state, however, it is impossible for the STA to transmit or receive a frame. When the STA has a pending uplink frame, the STA may switch from the doze state to the active state and transmit the uplink frame to the AP. On the contrary, when the AP has a pending frame to transmit to the STA in the doze state, the AP may not transmit the pending frame to the STA until the STA switches to the awake mode.

Thus, the STA may occasionally switch from the doze state to the awake state and receive information on whether there is a pending frame for the STA from the AP. The AP may transmit, to the STA, information on the presence of pending downlink data for the STA in view of time for the STA to switch to the awake state.

Specifically, the STA may periodically switch from the doze state to the awake state to receive a beacon frame in order to receive information on whether there is a pending frame for the STA. A beacon frame is a frame used for passive scanning of the STA and may include information on capability of the AP. The AP may periodically (for example, every 100 msec) transmit a beacon frame to the STA.

Figure 4:
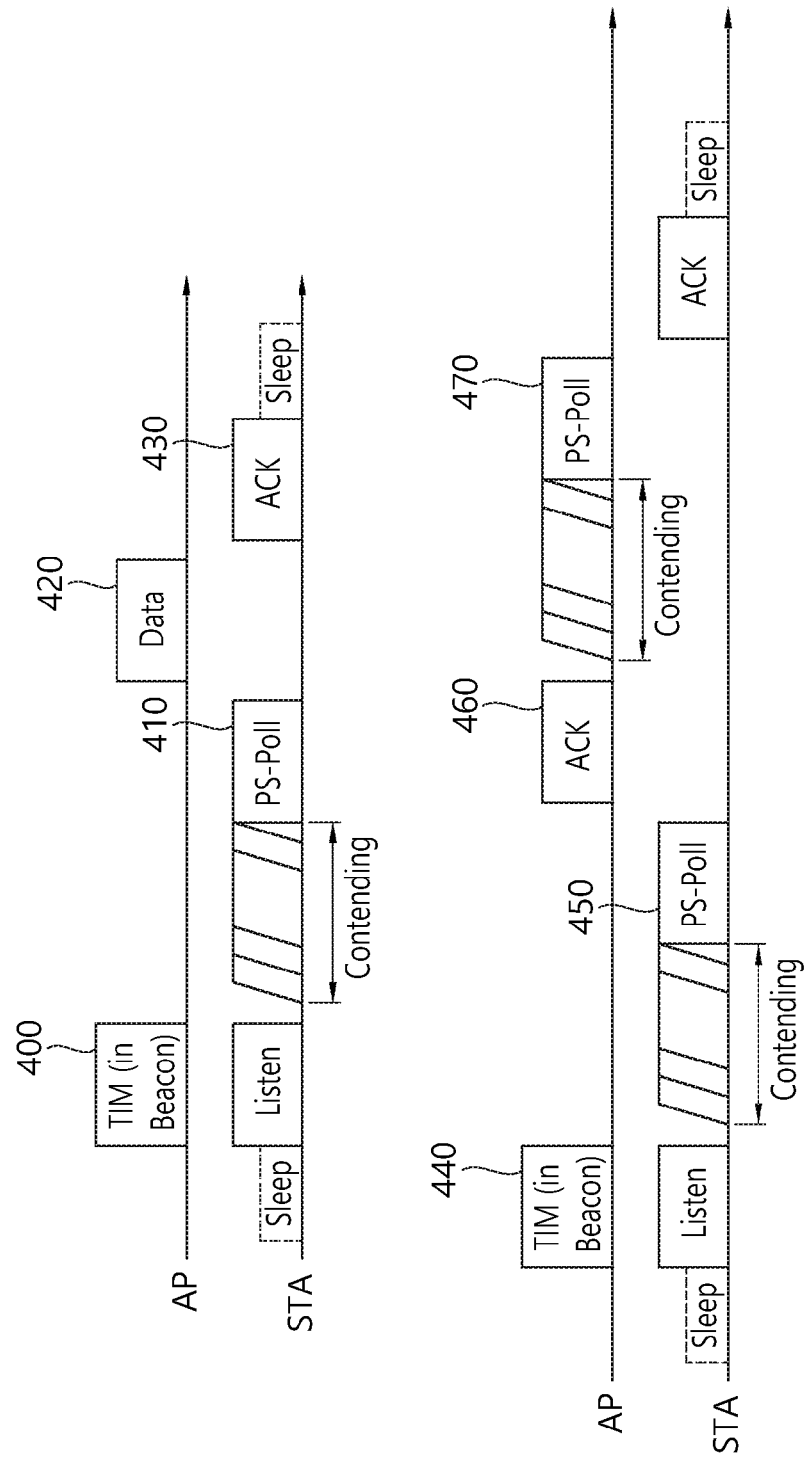
FIG. 4 is a conceptual view illustrating a power saving method based on a beacon frame.

FIG. 4 is a conceptual view illustrating a power saving method based on a beacon frame.

Referring to FIG. 4, an AP may periodically transmit a beacon frame, and an STA may periodically switch from the doze state to the awake state in view of a beacon frame transmission timing to receive the beacon frame.

The beacon frame may include a traffic indication map (TIM) element. The TIM element may be used to transmit information on downlink data to the STA which is pending in the AP. For example, the TIM element may transmit information on a pending frame to the STA based on a bitmap.

TIM elements may be classified into a TIM and a delivery TIM (DTIM). A TIM may indicate the presence of pending downlink data to be transmitted based on unicast. A DTIM may indicate the presence of pending downlink data to be transmitted based on broadcast/multicast.

An upper part of FIG. 4 illustrates a method in which an AP transmits a downlink frame based on an immediate response to a power save poll (PS-Poll) frame.

Referring to the upper part of FIG. 4, an STA may receive information on the presence of downlink data pending for the STA from the AP based on a TIM of a beacon frame 400. The STA may transmit a PS-Poll frame 410 to the AP. The AP may receive the PS-Poll frame 410 from the STA and transmit a downlink frame 420 as an immediate response to the PS-Poll frame 410 to the STA. The AP may transmit the immediate response to the PS-Poll frame after short interframe space (SIFS) after the PS-Poll frame is received.

The STA may transmit an acknowledgement (ACK) frame 430 in response to the downlink frame. When the AP terminates transmission of the downlink data pending for the STA, the STA may switch (or transition) back to the doze state.

A lower part of FIG. 4 illustrates a method in which an AP transmits a downlink frame based on a deferred response to a PS-Poll frame.

Referring to the lower part of FIG. 4, an STA may receive information on the presence of downlink data pending for the STA from the AP based on a TIM of a beacon frame 440. The STA may transmit a PS-Poll frame 450 to the AP. The AP may receive the PS-Poll frame 450 from the STA and transmit an ACK frame 460 to the STA in response to the PS-Poll frame 450. The AP may transmit a downlink frame 470 including the pending downlink data to the STA after transmitting the ACK frame 460. The STA may monitor the downlink frame 470 transmitted by the AP to the STA after receiving the ACK frame 460.

Likewise, when the AP terminates transmission of the downlink data pending for the STA, the STA may switch (or transition) from the awake state back to the doze state.

Figure 5:
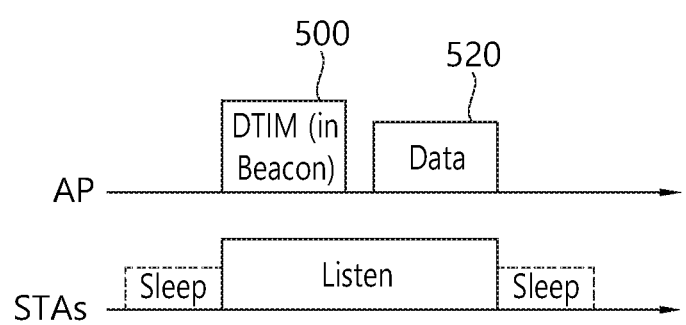
FIG. 5 is a conceptual view illustrating a power saving method based on a beacon frame.

FIG. 5 is a conceptual view illustrating a power saving method based on a beacon frame.

FIG. 5 illustrates a case where a DTIM is transmitted through a beacon frame 500. The beacon frame 500 may include the DTIM. As described above, the DTIM may indicate the presence of pending downlink data to be transmitted based on broadcast/multicast.

Referring to FIG. 5, an AP may transmit the beacon frame 500 including the DTIM to an STA. After receiving the beacon frame 500 including the DTIM, the STA may maintain the awake state without transmitting a PS-Poll frame and monitor transmission of a downlink frame 520. The AP may transmit the downlink frame 520 to the STA through a multicast method or broadcast method.

A conventional TIM element-based power saving mechanism (or power saving method) may have the following problems. First, the conventional mechanism may have overhead for signaling a PS-Poll frame. After switching from the doze state to the awake state, an STA may transmit a PS-Poll frame to an AP through contention-based access. When a plurality of STAs switches to the awake mode and transmits a PS-Poll frame at the same time, contention between the STAs may make it difficult to transmit the PS-Poll frame. Further, contention between the STAs may cause a substantial delay in receiving a downlink frame after receiving a beacon frame from the AP.

Hereinafter, an embodiment of the present invention illustrates a method of reducing signaling overhead and a reception delay of an STA operating in the power saving mode.

Figure 6:
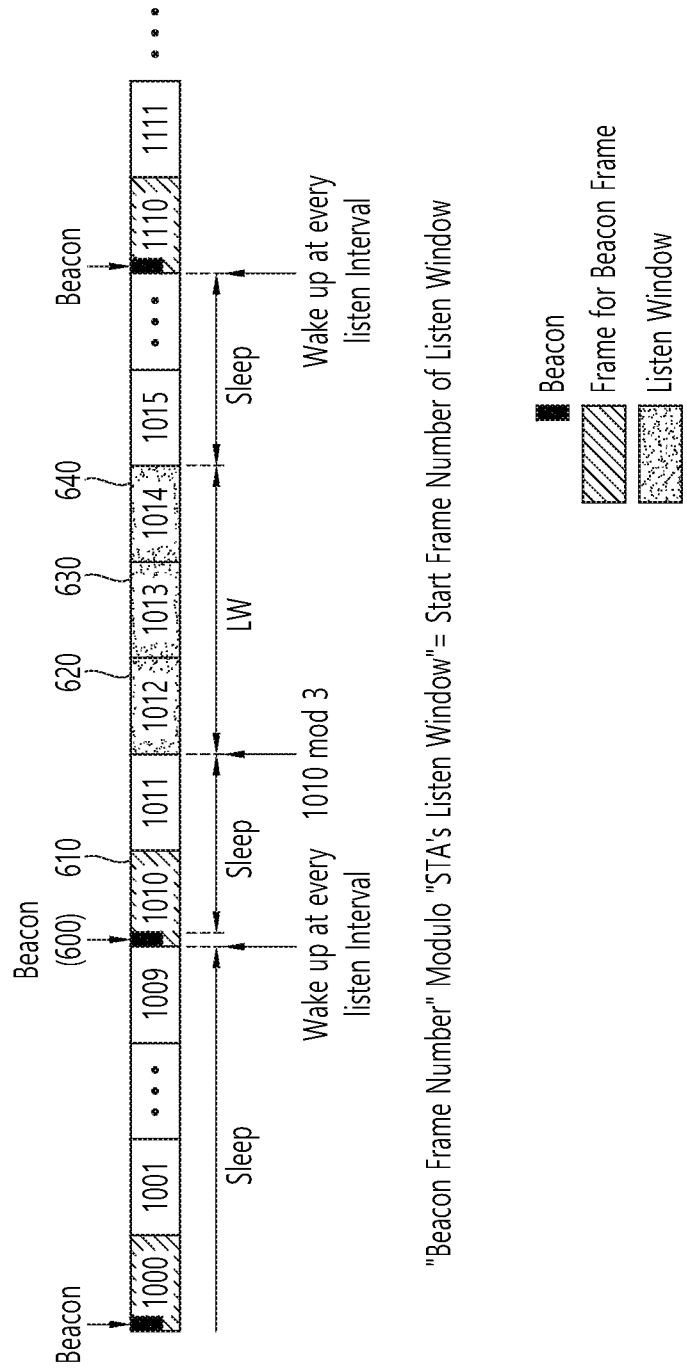
FIG. 6 is a conceptual view illustrating a power saving method according to an embodiment of the present invention.

FIG. 6 is a conceptual view illustrating a power saving method according to an embodiment of the present invention.

FIG. 6 illustrates a method in which an STA receives a beacon frame and receives a downlink frame from an AP without transmitting a PS-Poll frame.

Referring to FIG. 6, the STA may receive a downlink frame from the AP based on a frame number, a listen window, and a listen interval.

According to the embodiment of the present invention, a time resource in a WLAN may be identified by a frame number. For example, a transmission period of a beacon frame may be 100 ms, and one frame may be a time unit of 10 ms. In this case, a time resource between a beacon frame and a next beacon frame may correspond to 10 frames. For example, when a current beacon frame is transmitted on a time resource corresponding to frame number 1000, a next beacon frame may be transmitted on a time resource corresponding to frame number 1010. The frame number may indicate a time resource for transmitting or receiving a frame.

A beacon frame transmitted by the AP may include information on a frame number corresponding to a transmission time resource for the beacon frame. That is, the frame number of the beacon frame may indicate information on the transmission time resource for the beacon frame. The STA receiving the beacon frame transmitted by the AP may determine a monitoring period for a downlink frame (or a transmission (or reception) period for the downlink frame) including downlink data pending for the STA based on the frame number of the beacon frame, the listen window of the STA, and the listen interval of the STA.

For example, the STA receiving the beacon frame may determine a transmission timing of the downlink frame including the downlink data pending for the STA to be transmitted by the AP based on a modulo operation. Specifically, (beacon frame number) mod (STA's listen window) may determine a starting point of the monitoring period for the downlink frame of the STA (or transmission (or reception) period of the downlink frame). That is, (beacon frame number) mod (STA's listen window) may determine a monitoring start point for the downlink frame of the STA.

The frame number of the beacon frame may indicate the transmission time resource for the beacon frame, and the listen window of the STA may be a monitoring period for the downlink frame of the STA after the STA switches to the awake state. Information on the listen window may be included in an association response frame transmitted from the STA to the AP upon association between the STA and the AP. Alternatively, the information on the listen window may be determined by the AP and be included in an association request frame transmitted from the AP to the STA upon association between the STA and the AP.

The listen interval may be an interval between times when the STA switches to the awake state to receive the beacon frame. That is, the listen interval may be an interval between times when the STA operating in the power saving mode wakes up to receive the beacon frame. The listen interval may be a multiple of the transmission period of the beacon frame. For example, when the transmission period of the beacon frame is 100 msec, the listen interval may be 1000 msec (or 100 frames). Information on the listen interval may be included in an association request frame transmitted by the STA upon association between the STA and the AP.

The STA may wake up based on the listen interval, switch to the awake state, and receive the beacon frame. The STA may receive the beacon frame and stay back to the doze state until the monitoring start point determined based on (beacon frame number) mod (STA's listen window).

When a TIM included in the beacon frame indicates the presence of the downlink frame pending for the STA, the STA may switch to the awake state again after the monitoring start point. After switching to the awake state, the STA may monitor the downlink frame transmitted by the AP during a time period corresponding to the listen window. According to another embodiment of the present invention, considering the listen interval and the monitoring start point, the STA may maintain the doze state until the monitoring start point, switch to the awake state at the monitoring start point, and monitor the downlink frame transmitted by the AP during the time period corresponding to the listen window.

Referring to FIG. 6, the STA may switch to the awake state based on the listen interval and receive a beacon frame 600 corresponding to frame number 1010. The listen window of the STA may be 30 msec (or three frames), and the listen interval of the STA may be 1000 msec (or 100 frames).

(Beacon frame number) mod (STA's listen window) is 1010 mod 3, which is 2. That is, the monitoring start point of the STA is two frames (20 msec) away from the point at which the beacon frame 600 is received. Specifically, the monitoring start point of the STA may be a start point of a time resource corresponding to a frame number of a value after addition of the frame number of the beacon frame 600 and (beacon frame number) mod (STA's listen window).

In this case, the STA may receive the beacon frame 600 on a time resource 610 corresponding to frame number 1010 in the awake state and transition to the doze state before a time resource 620 corresponding to frame number 1012. When a TIM of the beacon frame 600 indicates the presence of downlink data pending for the STA, the STA may transition to the awake state again on the time resource 620 corresponding to frame number 1012 and monitor a downlink frame transmitted from the AP. The AP may transmit the downlink frame to the STA based on the listen window of the STA.

The STA may receive the downlink frame from the AP on a time resource (frames 1012, 1013, and 1014) corresponding to the listen window.

That is, the operation of the STA based on the power saving mode in the WLAN may be described as follows. The STA may receive a beacon frame from the AP on a beacon frame time resource for the beacon frame. A TIM included in the beacon frame may indicate downlink data pending for the STA.

Further, after receiving the beacon frame, the STA may maintain the sleep mode before a monitoring start time resource for a downlink frame carrying the downlink data and receive the downlink frame from the AP on a listen window including the monitoring start time resource. The monitoring start time resource may be determined based on an ID indicating the beacon frame time resource and the length of the listen window, and the listen window may be a downlink frame monitoring period of the STA.

Information on the listen window may be included in an association response frame transmitted by the AP to the STA, and the beacon frame may include information on the ID indicating the beacon frame time resource.

The ID indicating the beacon frame time resource is a first identification number for a time unit for transmitting the beacon frame, and the length of the listen window may be the number of time units included in the listen window. The monitoring start time resource may be a time resource corresponding to a second identification number after addition of the first identification number and a value resulting from an modulo operation, and the value resulting from the modulo operation may be (first identification number) mod (the number of time units).

That is, the STA may receive the beacon frame including the TIM indicating the pending downlink data, and receive the downlink frame including the downlink data pending for the STA implicitly considering the listen window without transmitting a PS-Poll frame. Using this method may reduce signaling overhead caused by the PS-Poll frame. Further, this method may distribute time resources for a plurality of STAs to separately receive downlink data, thereby reducing a delay in reception of downlink data.

Figure 7:
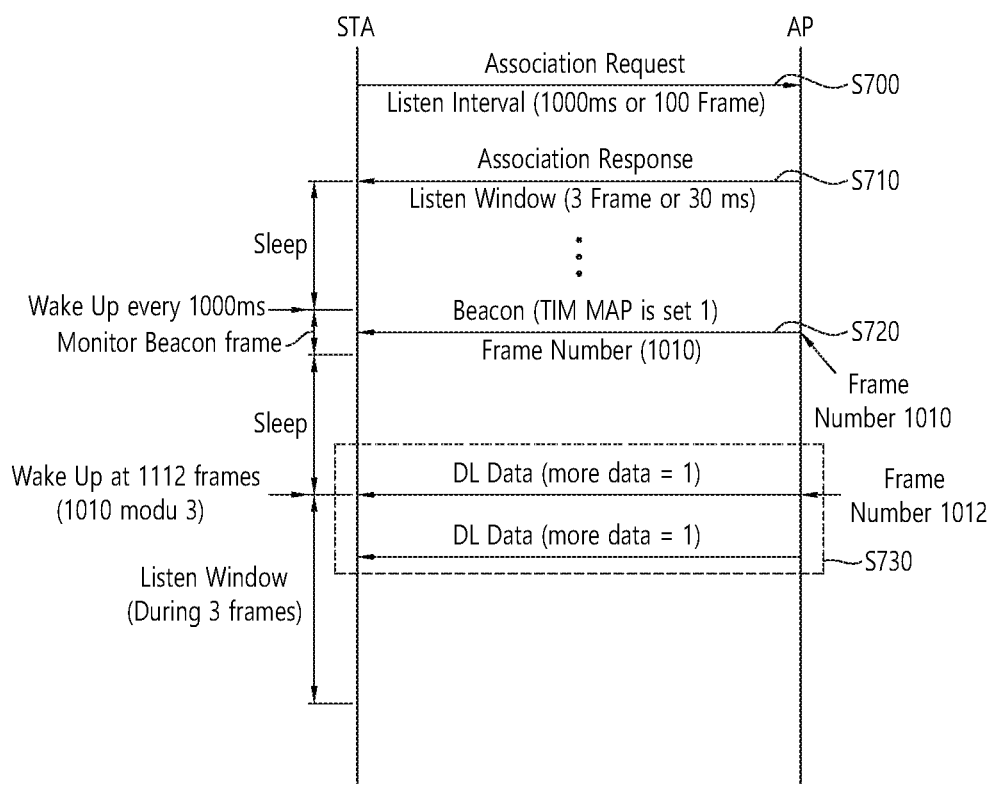
FIG. 7 is a conceptual view illustrating a method of transmitting a downlink frame in a listen window according to an embodiment of the present invention.

FIG. 7 is a conceptual view illustrating a method of transmitting a downlink frame in a listen window according to an embodiment of the present invention.

Referring to FIG. 7, an STA transmits an association request frame to an AP for association with the AP (step S700).

The association request frame transmitted by the STA may include information on a listen interval of the STA. The listen interval may be an interval between times when the STA switches to the awake state to receive a beacon frame.

The AP transmits an association response frame to the STA in response to the association request frame (step S710).

The association response frame transmitted by the AP may include information on a listen window. The listen window may be a downlink frame monitoring period of the STA. The AP may determine the length of the listen window for the STA in view of the size of downlink data pending for the STA, the number of other STAs associated with the AP, and the like.

Steps S700 and S710 illustrate a method of determining the listen interval and the listen window through an association procedure between the AP and the STA. The length of the listen interval and the length of the listen window may be determined or changed based on communication between the AP and STA after association, instead of on the association procedure. Further, as described above, the length of the listen window may be determined by the STA, in which case the association request frame transmitted by the STA may include the information on the listen window.

The STA transitions from the doze state to the awake state based on the listen interval and receives a beacon frame from the AP (step S720).

For example, the STA may transition from the doze state to the awake state every 100 msec based on a listen interval of 100 msec, and monitor and receive the beacon frame transmitted by the AP. When a TIM in the beacon frame indicates no downlink data pending for the STA, the STA may maintain the doze state until the next listen interval. When the TIM in the beacon frame indicates downlink data pending for the STA, the STA may stay in the doze state until a monitoring start point and switch to the awake state at the monitoring start point. Hereinafter, it is assumed that the TIM in the beacon frame indicates downlink data pending for the STA.

When the beacon frame is transmitted on a frame corresponding to frame number 1010 and the listen interval is a time period of three frames, the STA may receive the beacon frame and transition back to the doze state before a time period corresponding to frame number 1012. The monitoring start point may be determined based on the aforementioned modulo operation, (beacon frame number) mod (STA's listen window) (1010 mod 3=2). The monitoring start point may be a start point of a time resource corresponding to a frame number resulting from addition of the frame number of the beacon frame and (beacon frame number) mod (STA's listen window).

In FIG. 7, monitoring the downlink frame to the STA may start from a start point of a time period corresponding to frame number 1012 resulting from addition of frame number 1010 and 2.

The AP may transmit the downlink frame including the downlink data pending for the STAT to the STA in the time period starting from frame number 1012.

The AP may transmit the downlink frame to the STA in view of the listen window of the STA. For example, when the STA has a listen window of three frames (30 msec), the AP may transmit the downlink frame to the STA during a time period corresponding to frame numbers 1012, 1013, and 1014 (step S730).

The STA may monitor and receive the downlink frame transmitted from the AP during the time period of three frames corresponding to frame numbers 1012, 1013, and 1014.

The STA may transition back to the doze state after the listen window.

Figure 8:
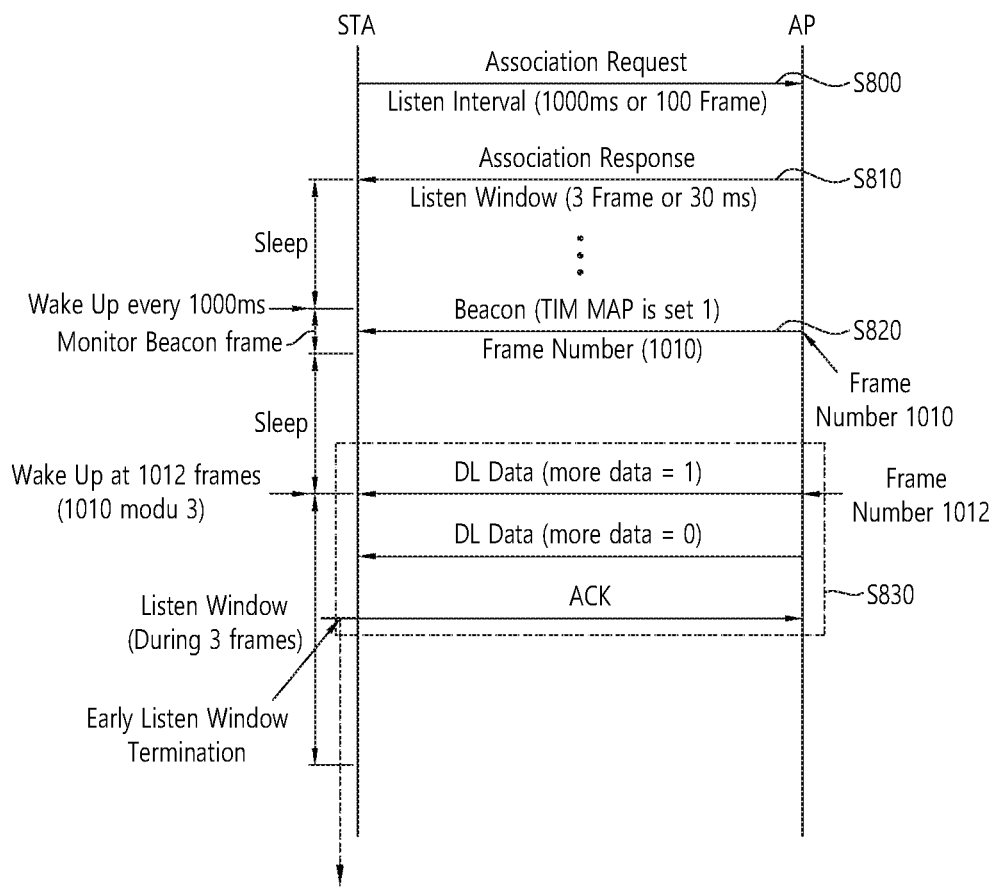
FIG. 8 is a conceptual view illustrating a method of transmitting a downlink frame in a listen window according to an embodiment of the present invention.

FIG. 8 is a conceptual view illustrating a method of transmitting a downlink frame in a listen window according to an embodiment of the present invention.

FIG. 8 illustrates a method of terminating communication between an STA and an AP when the AP terminates transmission of downlink data pending for the STA within a time period corresponding to a listen window of the STA.

Referring to FIG. 8, the STA transmits an association request frame to the AP for association with the AP (step S800).

The association request frame transmitted by the STA may include information on a listen interval of the STA.

The AP transmits an association response frame to the STA in response to the association request frame from the STA (step S810).

The association response frame transmitted by the AP may include information on the listen window.

The STA transitions from the doze state to the awake state based on the listen interval and receives a beacon frame from the AP (step S820).

Hereinafter, it is assumed that a TIM in the beacon frame indicates downlink data pending for the STA. For example, when the beacon frame is transmitted on a frame corresponding to frame number 1010 and the listen interval is a time period of three frames, the STA may receive the beacon frame and transition back to the doze state before a time period corresponding to frame number 1012. As described above, the STA may determine a monitoring start point, monitor a downlink frame from the monitoring start point, and receive the downlink frame (step S830).

In FIG. 8, transmission of the downlink data pending for the STA terminates within the time period corresponding to the listen window of the STA.

For example, when the STA has a listen window of three frames (30 msec), the AP may transmit the downlink frame to the STA during a time period corresponding to frame numbers 1012, 1013, and 1014. When transmission of the downlink data pending for the STA is terminated in a time period corresponding to 1013, the AP may set a more data field included in a last downlink frame carrying the pending downlink data to have a value of 0.

The AP may indicate whether transmission of the downlink data pending for the STA is terminated based on the value of the more data field. For example, when the more data field included in the downlink frame has a value of 1, the AP may indicate that there is still remaining downlink data pending for the STA. When the more data field included in the downlink frame has a value of 0, the AP may indicate there is no more remaining downlink data pending for the STA and transmission of the downlink data is terminated.

When the more data field in the received downlink frame has a value of 0, the STA may recognize that the AP terminates transmission of the downlink frame and transition to the doze state in a remaining period corresponding to the listen window (for example, a time period corresponding to 1014).

That is, when the AP terminates transmission of the downlink data early, the STA may transition to the doze state earlier.

Figure 9:
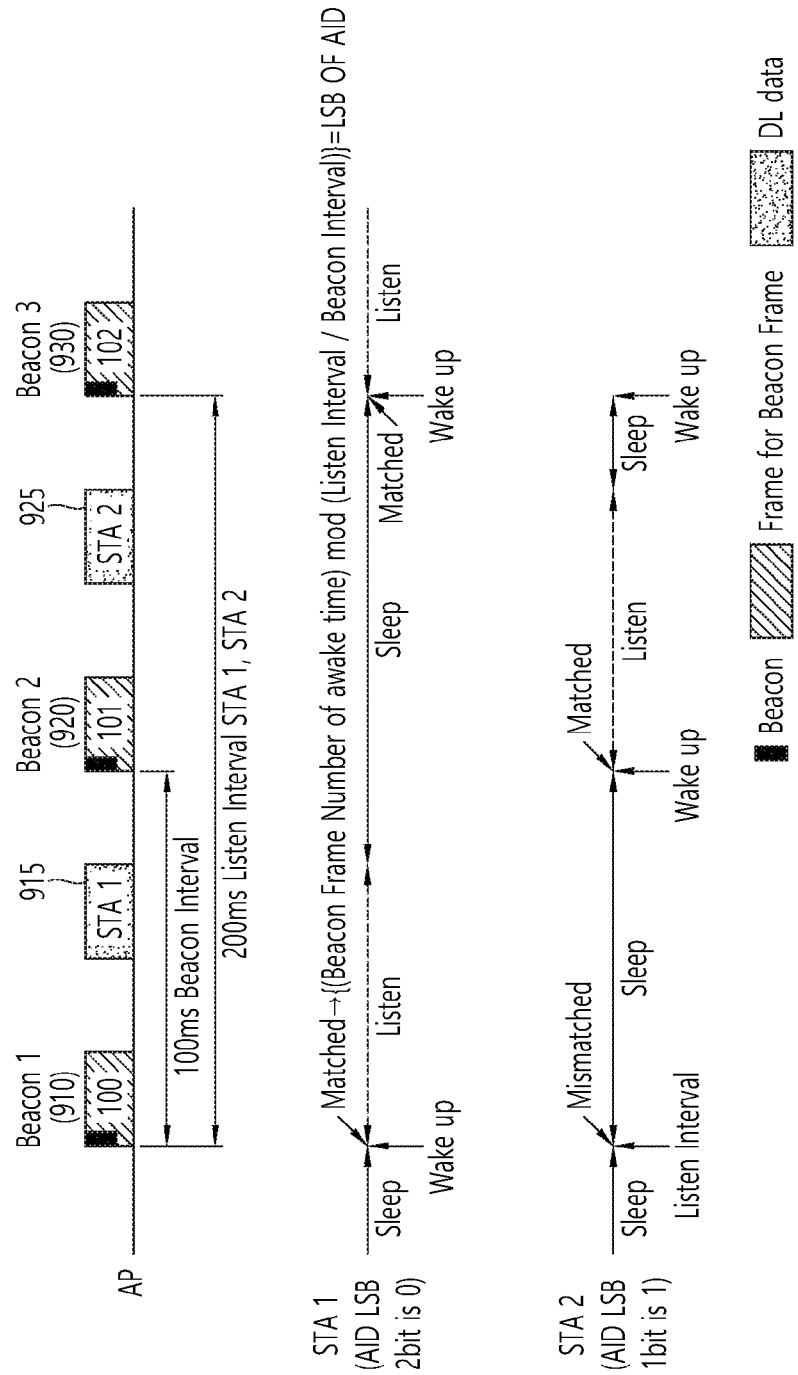
FIG. 9 is a conceptual view illustrating a power saving method according to an embodiment of the present invention.

FIG. 9 is a conceptual view illustrating a power saving method according to an embodiment of the present invention.

FIG. 9 illustrates operations of an STA and an AP transmitting or receiving a pending downlink frame based on a frame number of a beacon frame, an ID (AID) of an STA, and a listen interval.

Referring to FIG. 9, when (beacon frame number) mod (listen interval/beacon transmission period (or beacon interval)) is equal to a least significant bit (LSB) of the AID, the STA may switch to the awake mode and receive the beacon frame transmitted by the AP. The beacon interval may alternatively be referred to as a target beacon transmission time (TBTTT).

The STA may receive the beacon frame and acquire information on the frame number of the beacon frame. The STA may acquire information on a frame number of a beacon frame to be transmitted although not directly receiving the beacon frame in view of a beacon interval of a subsequently transmitted beacon frame.

According to the embodiment of the present invention, when (beacon frame number) mod (listen interval/beacon transmission period) is not equal to the LSB of the AID, the STA may maintain the doze state, instead of switching to the awake state, in a transmission timing of the beacon frame. When (beacon frame number) mod (listen interval/beacon transmission period) is equal to the LSB of the AID of the STA, the beacon frame may be referred to as a beacon frame matched to the STA. When (beacon frame number) mod (listen interval/beacon transmission period) is not equal to the LSB of the AID of the STA, the beacon frame may be referred to as a beacon frame mismatched to the STA.

Referring to FIG. 9, it may be assumed that the listen interval is 200 msec (20 frames) and a beacon frame transmission period is 100 msec.

Beacon frame 1 910 to be transmitted by the AP to STA 1 may have a frame number of 100, the listen interval is 200 msec, and the beacon transmission period may be 100 msec. Further, the LSB of an AID of STA 1 may be 0. STA 1 may determine whether 100 mod 200/100 is equal to the LSB of the AID of STA 1. When 100 mod 200/100 and the LSB of the AID of STA 1 are equal to 0, STA 1 may transition to the awake state and receive beacon frame 1 910 in a time period corresponding to frame number 100. Beacon frame 1 910 may be a beacon frame matched to STA 1.

STA 1 may determine whether there is downlink data pending for STA 1 based on a TIM element in beacon frame 1 910. The TIM element in beacon frame 1 910 indicates the presence of the downlink data pending for STA 1, STA 1 may monitor and receive a downlink frame 915 transmitted by the AP.

When beacon frame 2 920 has a frame number of 101, (beacon frame number) mod (listen interval/beacon transmission period) may not be equal to the LSB of the AID of STA 1. Beacon frame 2 920 may be a beacon frame mismatched to STA 1.

STA 1 may switch to the awake mode when beacon frame 3 930 is transmitted on a time period corresponding to frame number 102 based on the listen interval. Since beacon frame 3 930 of frame number 102 is a beacon frame matched to STA 1, STA 1 may switch to the awake state and receive beacon frame 3 930.

The LSB of an AID of STA 2 may be 1. When beacon frame 1 910 has a frame number of 100, 100 mod 200/100 is 0 and the LSB of the AID of STA 2 is 1. Thus, the two values are different. In this case, STA 2 may not receive beacon frame 1 910 but maintain the doze state in the time period corresponding to frame number 100.

When beacon frame 2 920 has a frame number of 101, (beacon frame number) mod (listen interval/beacon transmission period) may be equal to the LSB of the AID of STA 2. In this case, STA 2 may receive beacon frame 2 920 transmitted in a time period corresponding to frame number 101.

STA 2 may determine whether there is downlink data pending for STA 2 based on a TIM element in beacon frame 2 920 of frame number 101. The TIM element in beacon frame 2 920 indicates the presence of the downlink data pending for STA 2, STA 2 may monitor and receive a downlink frame 925 transmitted by the AP.

Figure 10:
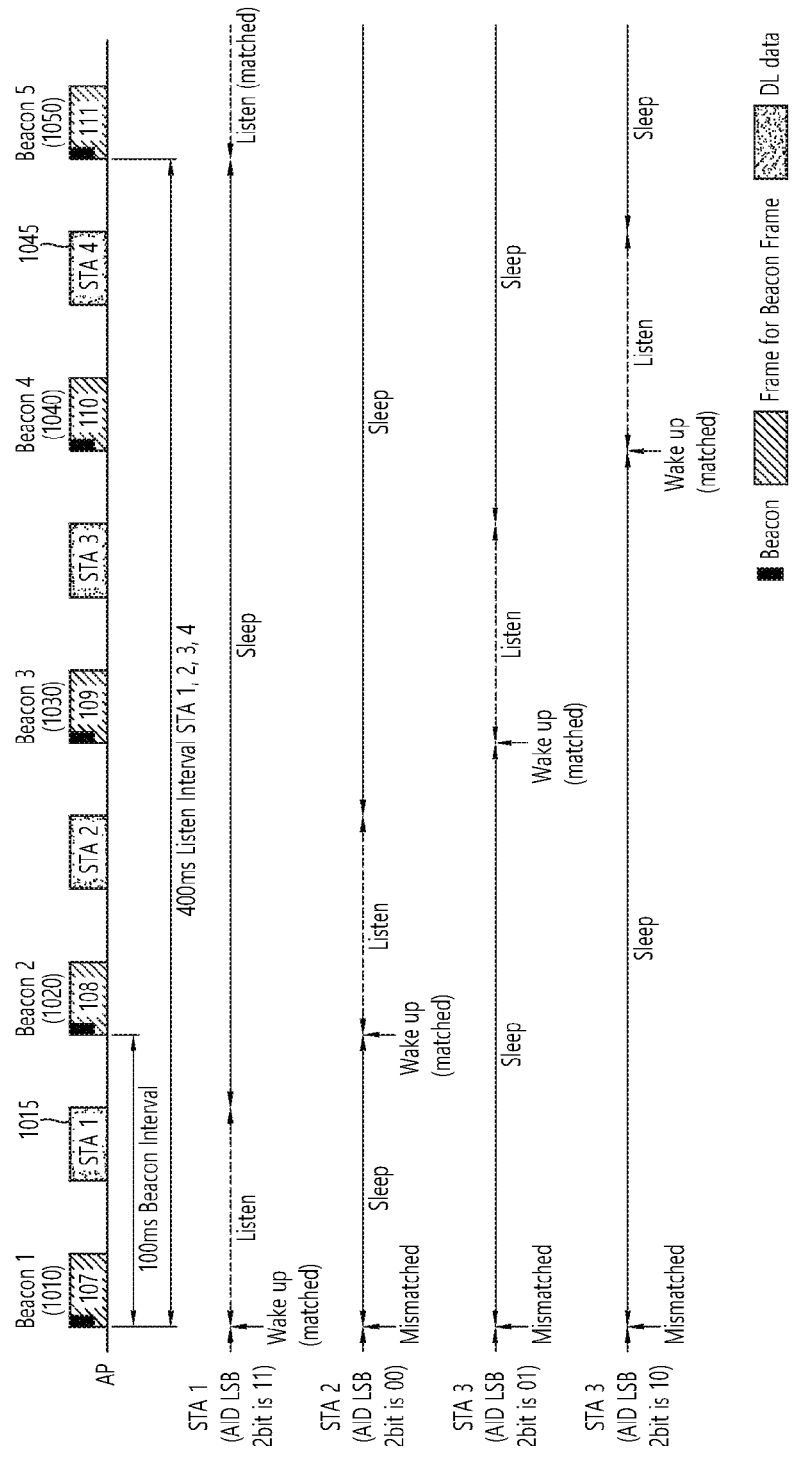
FIG. 10 is a conceptual view illustrating a power saving method according to an embodiment of the present invention.

FIG. 10 is a conceptual view illustrating a power saving method according to an embodiment of the present invention.

FIG. 10 illustrates a method in which an AP transmits downlink data pending for an STA to the STA based on the two LSBs of an AID of the STA.

It may be assumed that a listen interval is 400 msec (40 frames) and a TBTT is 100 msec.

The two LSBs of an AID of STA 1 may be 11, the two LSBs of an AID of STA 2 may be 00, the two LSBs of an AID of STA 3 may be 01, and the two LSBs of an AID of STA 4 may be 10.

Referring to FIG. 10, when beacon frame 1 1010 corresponds to frame number 107, (beacon frame number) mod (listen interval/beacon transmission period) may be 107 mod 4=3. Since the two LSBs of the AID of STA 1 is 11, when beacon frame 1 1010 of frame number 107 is transmitted, STA 1 may switch to the awake state and receive beacon frame 1 1010 of frame number 107.

When a TIM in beacon frame 1 1010 of frame number 107 indicates that the AP has downlink data pending for STA 1, STA 1 may maintain the awake state and monitor and receive downlink frame 1 1015 transmitted by the AP. Since the listen interval of the STA is 400 msec, when beacon frame 5 1050 of frame number 111 is transmitted, the STA may switch to the awake mode again and receive the beacon frame.

Describing the method again with reference to STA 3, (beacon frame number) mod (listen interval/beacon transmission period) determined based on beacon frame 1 1010 of frame number of 107 and beacon frame 2 1020 of frame number 108 may not be equal to the two LSBs of the AID of STA 3. In this case, STA 3 may maintain the doze state. When beacon frame 3 1030 corresponds to frame number 109, (beacon frame number) mod (listen interval/beacon transmission period (or beacon interval)) may be 109 mod 4=1. Since the two LSBs of the AID of STA 3 are 01, when beacon frame 3 1030 of frame number 109 is transmitted, STA 3 may switch to the awake state and receive beacon frame 3 1030 of frame number 109.

For the operations in FIG. 9 and FIG. 10, the STA may determine a transmission timing of a matched beacon frame to subsequently receive based on a frame number of a first received beacon frame and receive the matched beacon frame. After receiving the first matched beacon frame, the STA may switch to the awake state according to the listen interval and receive a matched beacon frame. For example, the STA may receive a first received beacon frame regardless of whether the beacon frame is matched or mismatched. The STA may determine a transmission timing of a matched beacon frame to be subsequently transmitted based on a frame number of the first received beacon frame. The STA may transition to the awake state at the transmission timing of the matched beacon frame and receive the matched beacon frame. Subsequently, the STA may transition to the awake state based on the listen interval and receive another matched beacon frame. A beacon frame received by the STA transitioning to the awake state based on the listen interval may be a matched beacon frame. That is, a beacon frame received by the STA transitioning to the awake state based on the listen interval after receiving the first matched bacon frame may be a matched beacon frame having (beacon frame number) mod (listen interval/beacon transmission period) equal to the LSB of the AID of the STA. The listen interval of the STA may be determined based on a transmission period of a matched beacon frame (or LSBs of the AID of the STA used to determine a matched beacon frame).

Figure 11:
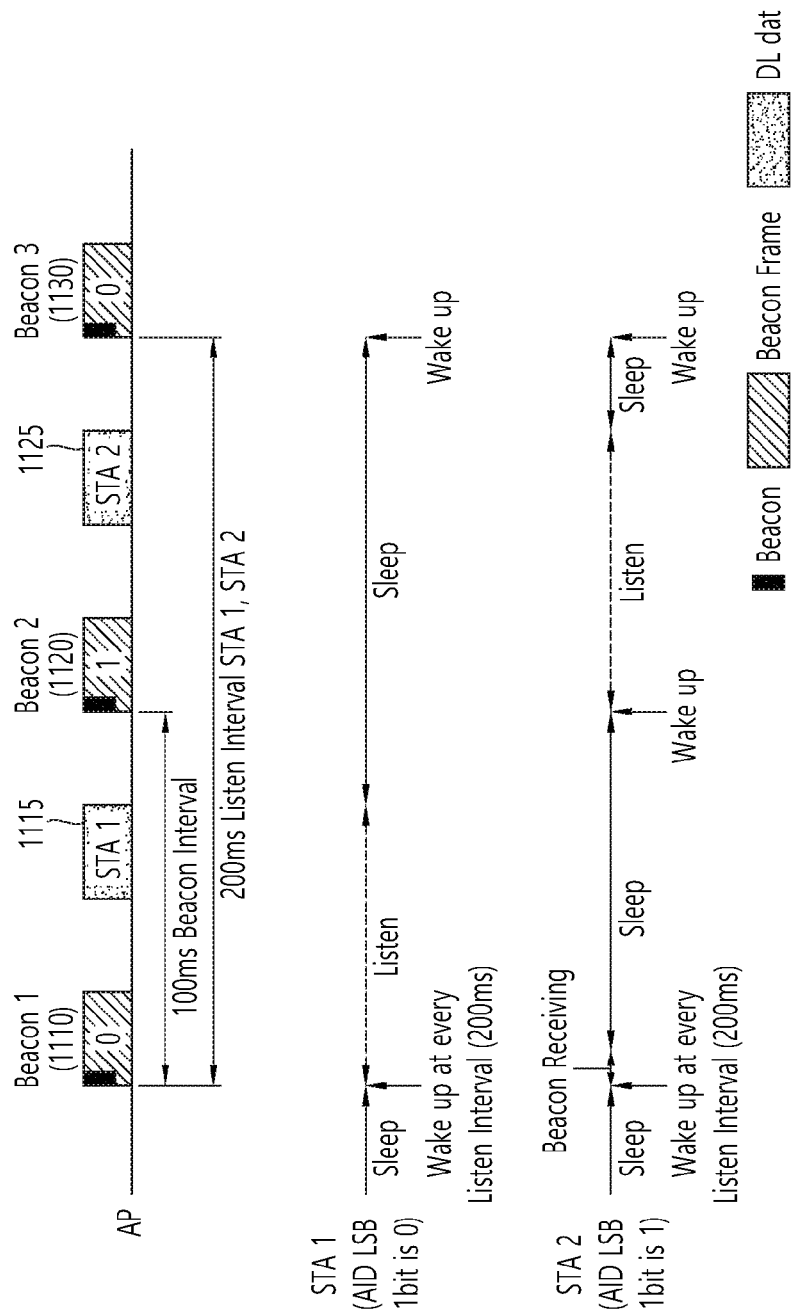
FIG. 11 is a conceptual view illustrating a power saving method according to an embodiment of the present invention.

FIG. 11 is a conceptual view illustrating a power saving method according to an embodiment of the present invention.

FIG. 11 illustrates a method of determining whether to receive a beacon frame transmitted from an AP based on whether the LSB of a frame number of the beacon frame is equal to the LSB of an AID of an STA.

A listen interval of the STA may be determined to be 100 msec×$2^N$ (where N is natural number).

N may be the number of bits used to determine a matched beacon frame. It may be determined whether the transmitted beacon frame is a matched beacon frame based on whether N LSBs of the frame number of the beacon frame is equal to N LSBs of the AID of the STA.

When N=1 (that is, the listen interval is 200 msec), the STA may determine whether to receive the beacon frame based on one LSB of the frame number and one bit of the AID of the STA. When N=2, the STA may determine whether to receive the beacon frame based on two LSBs of the frame number and two bits of the AID of the STA.

FIG. 11 illustrates a method in which the STA receives the beacon frame when N=1.

Referring to FIG. 11, one LSB of an AID of STA 1 may be 0. In this case, when beacon frame 1 1110 with a frame number having one LSB of 0 is transmitted, STA 1 may switch to the awake mode and receive beacon frame 1 1110.

A TIM in beacon frame 1 1110 with the frame number having one LSB of 0 indicates the presence of downlink data pending for STA 1, STA 1 may maintain the awake state and monitor and receive a downlink frame 1115 transmitted by the AP. Since the listen interval of STA 1 is 200 msec, when STA 1 switches to the awake mode again based on the listen interval, STA 1 may receive beacon frame 3 1130 with a frame number having one LSB of 0.

One LSB of an AID of STA 2 may be 1. In this case, when beacon frame 2 1120 with a frame number having one LSB of 1 is transmitted, STA 2 may switch to the awake mode and receive beacon frame 2 1120.

A TIM in beacon frame 2 1120 with the frame number having one LSB of 1 indicates that the AP has downlink data pending for STA 2, STA 2 may maintain the awake state and monitor and receive a downlink frame 1125 transmitted by the AP. Since the listen interval of STA 2 is 200 msec, when STA 2 switches to the awake mode again based on the listen interval, STA 2 may receive a beacon frame with a frame number having one LSB of 1.

Figure 12:
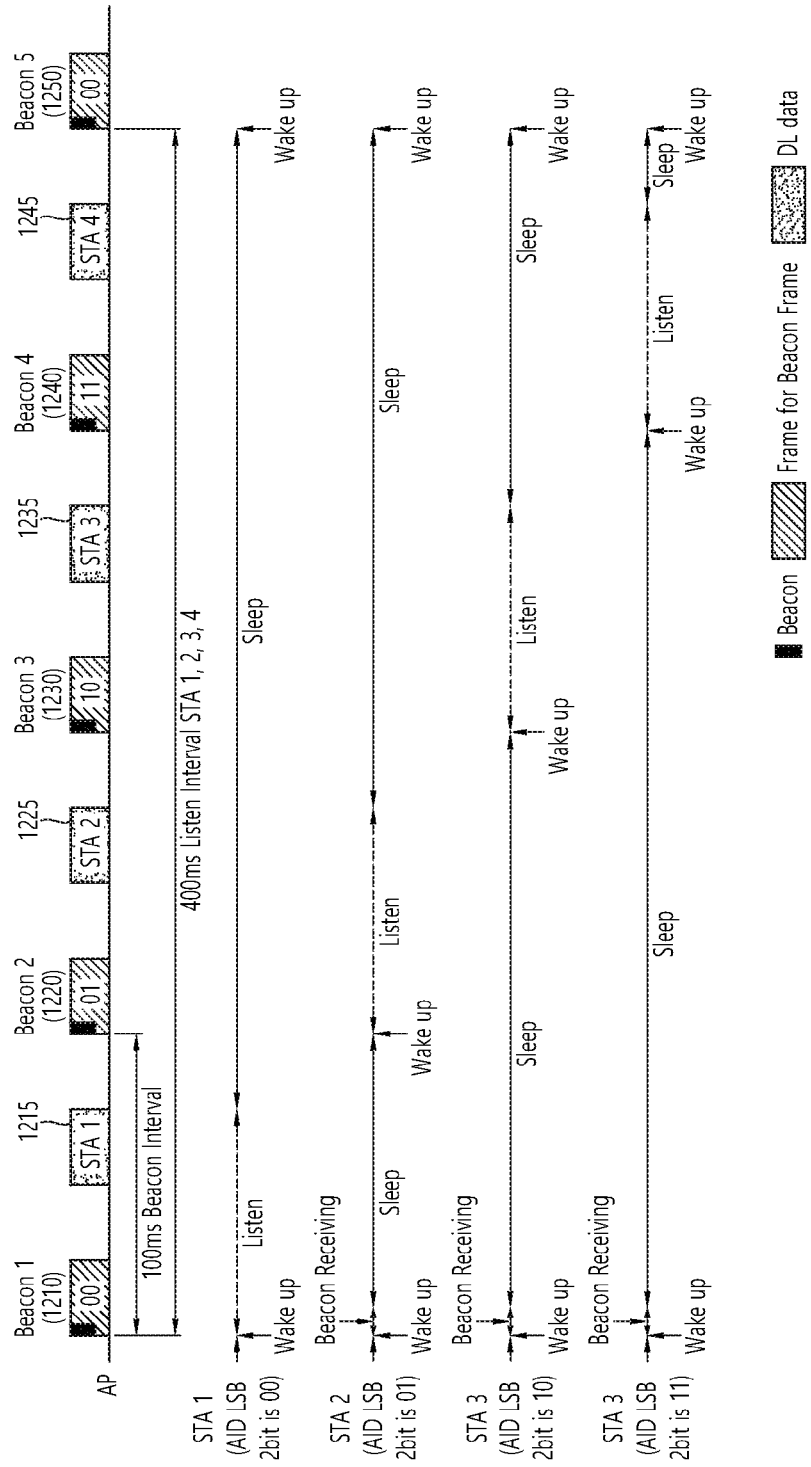
FIG. 12 is a conceptual view illustrating a power saving method according to an embodiment of the present invention.

FIG. 12 is a conceptual view illustrating a power saving method according to an embodiment of the present invention.

FIG. 12 illustrates a method of determining whether to receive a beacon frame transmitted from an AP based on whether the LSB of a frame number of a beacon frame is equal to the LSB of an AID of an STA.

FIG. 12 illustrates the method when N=2 (that is, the listen interval is 400 msec). When N=2, the STA may determine whether to receive the beacon frame based on two LSBs of the frame number and two LSB bits of the AID of the STA. When N=2, the STA may determine whether to receive the beacon frame based on two LSBs of the frame number and two LSB bits of the AID of the STA.

Referring to FIG. 12, two LSBs of an AID of STA 1 may be 00. In this case, when beacon frame 1 1210 with a frame number having two LSBs of 00 is transmitted, STA 1 may switch to the awake mode and receive beacon frame 1 1210.

A TIM in beacon frame 1 1210 with the frame number having two LSBs of 00 indicates that the AP has downlink data pending for STA 1, STA 1 may maintain the awake state and monitor and receive a downlink frame 1215 transmitted by the AP. Since the listen interval of STA 1 is 400 msec, when STA 1 switches to the awake mode again based on the listen interval, STA 1 may receive beacon frame 5 1250 with a frame number having two LSBs of 00.

Two LSBs of an AID of STA 2 may be 01. In this case, when beacon frame 2 1220 with a frame number having two LSBs of 01 is transmitted, STA 2 may switch to the awake mode and receive beacon frame 2 1220.

A TIM in beacon frame 2 1220 with the frame number having two LSBs of 01 indicates that the AP has downlink data pending for STA 2, STA 2 may maintain the awake state and monitor and receive a downlink frame 1225 transmitted by the AP. Since the listen interval of STA 2 is 400 msec, when STA 2 switches to the awake mode again based on the listen interval, STA 2 may receive beacon frame 2 with a frame number having two LSBs of 01.

Two LSBs of an AID of STA 3 may be 10. In this case, when beacon frame 3 1230 with a frame number having two LSBs of 10 is transmitted, STA 3 may switch to the awake mode and receive beacon frame 3 1230.

A TIM in beacon frame 3 1230 with the frame number having two LSBs of 10 indicates that the AP has downlink data pending for STA 3, STA 3 may maintain the awake state and monitor and receive a downlink frame 1235 transmitted by the AP. Since the listen interval of STA 3 is 400 msec, when STA 3 switches to the awake mode again based on the listen interval, STA 3 may receive a beacon frame with a frame number having two LSBs of 10.

Two LSBs of an AID of STA 4 may be 11. In this case, when beacon frame 4 1240 with a frame number having two LSBs of 11 is transmitted, STA 4 may switch to the awake mode and receive beacon frame 4 1240.

A TIM in beacon frame 4 1240 with the frame number having two LSBs of 11 indicates that the AP has downlink data pending for STA 4, STA 4 may maintain the awake state and monitor and receive a downlink frame 1245 transmitted by the AP. Since the listen interval of STA 4 is 400 msec, when STA 4 switches to the awake mode again based on the listen interval, STA 4 may receive a beacon frame with a frame number having two LSBs of 11.

For the operations in FIG. 11 and FIG. 12, the STA may determine a transmission timing of a matched beacon frame to subsequently receive based on a frame number of a first received beacon frame and receive the matched beacon frame. After receiving the first matched beacon frame, the STA may switch to the awake state according to the listen interval and receive a matched beacon frame. For example, the STA may receive a first received beacon frame regardless of whether the beacon frame is matched or mismatched. The STA may determine a transmission timing of a matched beacon frame to be subsequently transmitted based on a frame number of the first received beacon frame. The STA may transition to the awake state at the transmission timing of the matched beacon frame and receive the matched beacon frame. Subsequently, the STA may transition to the awake state based on the listen interval and receive another matched beacon frame. A beacon frame received by the STA transitioning to the awake state based on the listen interval may be a matched beacon frame. That is, a beacon frame received by the STA transitioning to the awake state based on the listen interval after receiving the first matched bacon frame may be a matched beacon frame with a frame number having the LSB equal to the LSB of the AID of the STA.

When the downlink data transmission methods illustrated in FIGS. 9 to 12 are used, downlink data transmission to STAs may be performed in a distributed manner and unnecessary power consumption due to unnecessary contention between a plurality of STAs may be avoided.

Figure 13:
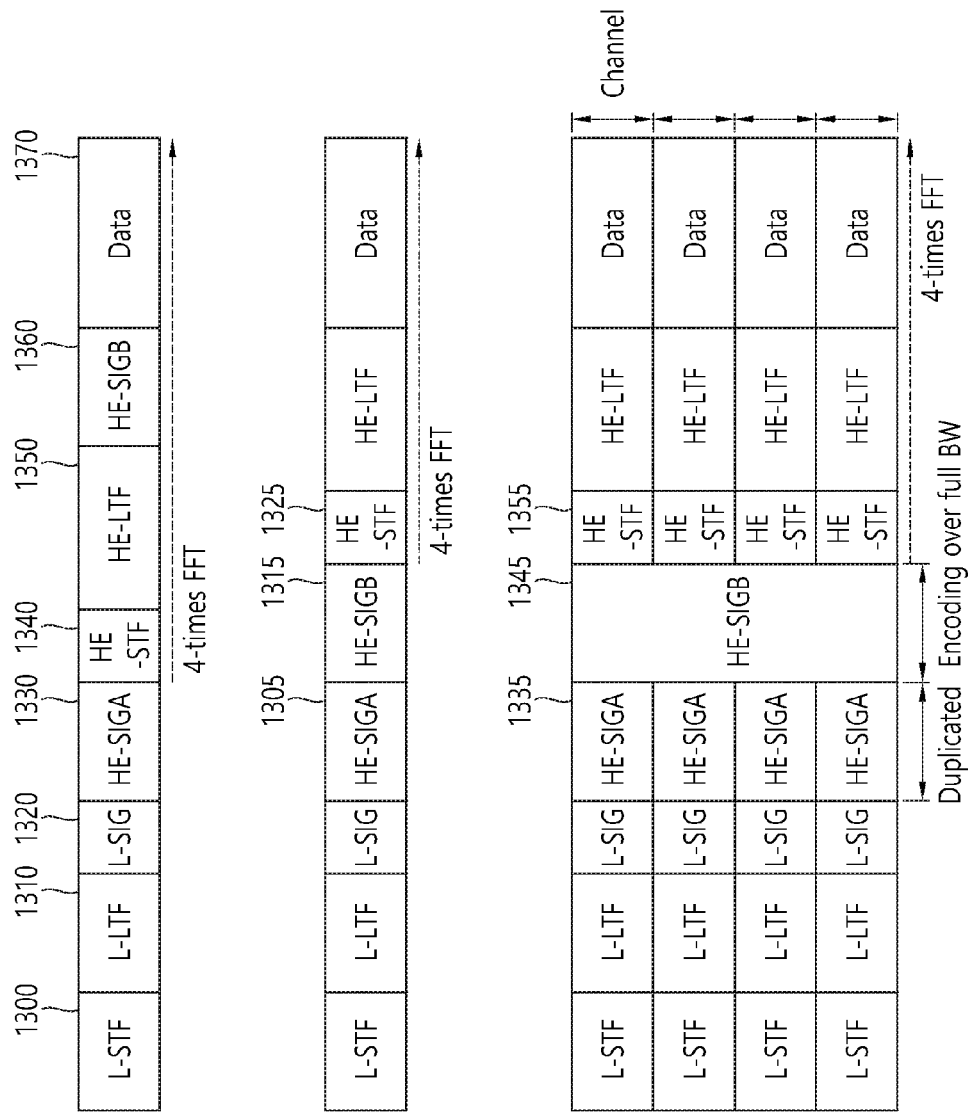
FIG. 13 is a conceptual view illustrating a format of a physical layer convergence procedure (PLCP) protocol data unit (PPDU) carrying a frame according to an embodiment of the present invention.

FIG. 13 is a conceptual view illustrating a format of a physical layer convergence procedure (PLCP) protocol data unit (PPDU) carrying a frame according to an embodiment of the present invention.

FIG. 13 illustrates a PPDU format according to an embodiment of the present invention. A PPDU may include a PPDU header and an MAC protocol data unit (MPDU or physical layer service data unit (PSDU)). A frame may correspond to an MPDU. The PPDU header in the PPDU format may be used to include a PHY header and a PHY preamble of the PPDU.

The PPDU format illustrated in FIG. 13 may be used to carry a beacon frame and a downlink frame described above.

Referring to an upper part of FIG. 13, a PPDU header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal-B (HE-SIG B). A legacy part may include from the PHY header to the L-SIG, and a high efficiency (HE) part may include fields after the L-SIG.

The L-STF 1300 may include a short training orthogonal frequency division multiplexing (OFDM) symbol. The L-STF 1300 may be used for frame detection, automatic gain control (AGC), diversity detection, and coarse frequency/time synchronization.

The L-LTF 1310 may include a long training OFDM symbol. The L-LTF 1310 may be used for fine frequency/time synchronization and channel estimation.

The L-SIG 1320 may be used to transmit control information. The L-SIG 1320 may include information on data rate and data length.

The HE-SIG A 1330 may include STA identification information to indicate a target STA to receive the downlink PPDU. The STA may determine whether to receive the PPDU based on target STA ID information included in the HE-SIG A 1330. When the STA is indicated based on the HE-SIG A 1330 of the downlink PPDU, the STA may perform additional decoding on the downlink PPDU. Further, the HE-SIG A 1330 may include information on a resource used to receive downlink data (frequency resource (or sub-band) in orthogonal frequency division multiplexing access (OFDMA)-based transmission) or a space-time stream resource (in multiple-input and multiple-output (MIMO) transmission).

The HE-SIG A 1330 may also include information on a frame number transmitted by the PPDU.

The HE-STF 1340 may be used to improve automatic gain control estimation in an MIMO environment or OFDMA environment.

The HE-LTF 1350 may be used to estimate a channel in the MIMO environment or OFDMA environment.

The HE-SIG B 1360 may include information on physical layer service data unit (PSDU) length and a modulation and coding scheme (MCS) for each STA, tail bits, and the like.

An inverse fast Fourier transform (IFFT) applied to the HE-STF 1340 and fields after the HE-STF 1340 may have a different size from an IFFT applied to fields before the HE-STF 1340. For example, the IFFT applied to the HE-STF 1340 and the fields after the HE-STF 1340 may have a size four times larger than that applied to the fields before the HE-STF 1340. When the STA receives a downlink frame, the STA may decode the HE-SIG A 1330 of the downlink frame and determine whether to decode fields after the HE-SIG A 1330 based on target STA ID information included in the HE-SIG A 1330. In this case, when the target STA ID information included in the HE-SIG A 1330 indicates an ID of the STA, the STA may decode the HE-STF 1340 and the fields after the HE-STF 1340 based on an FFT with a modified size. However, when the target STA ID information included in the HE-SIG A 1330 does not indicate the ID of the STA, the STA may stop decoding and set a network allocation vector (NAV). A cyclic prefix (CP) of the HE-STF 1340 may have a larger size than CPs of other fields, and the STA may decode the downlink PPDU by changing the FFT size during CP duration.

The fields of the PPDU format illustrated in the upper part of FIG. 13 may be configured in a different order. For example, as illustrated in a middle part of FIG. 13, the HE-SIG B 1315 of the HE part may be positioned immediately after the HE-SIG A 1305. The STA may decode up to the HE-SIG A 1305 and the HE-SIG B 1315, receive necessary control information, and set an NAV. Likewise, an IFFT applied to the HE-STF 1325 and fields after the HE-STF 1325 may have a different size from an IFFT applied to fields before the HE-STF 1325.

The STA may receive the HE-SIG A 1305 and the HE-SIG B 1315. When an ID of a target STA in the HE-SIG A 1305 instructs the STA to receive the downlink PPDU, the STA may decode the downlink PPDU by changing an FFT size from the HE-STF 1325. However, when the STA receives the HE-SIG A 1305 and is not instructed to receive the downlink PPDU based on the HE-SIG A 1305, the STA may set an NAV.

A lower part of FIG. 13 illustrates a downlink PPDU format for downlink multi-user (MU) transmission. A downlink PPDU may be transmitted to the STA through different downlink transmission resources (frequency resources or spatial streams) based on OFDMA. That is, downlink data may be transmitted to a plurality of STAs through a plurality of sub-bands based on the downlink PPDU format for downlink MU transmission. In the foregoing embodiments, it is assumed that the AP transmits a downlink frame including downlink data pending for one STA. According to another embodiment of the present invention, however, the AP may transmit downlink data in the downlink PPDU format for downlink MU transmission to a plurality of STAs in the awake state.

Fields before the HE-SIG B 1345 in the downlink PPDU may be transmitted in a duplicated form through different downlink transmission resources. The HE-SIG B 1345 may be transmitted in an encoded form on all transmission resources. Fields after the HE-SIG B 1345 may include individual information for each of a plurality of STAs receiving the downlink PPDU.

When the fields included in the downlink PPDU are transmitted through downlink transmission resources, respectively, CRCs for the respective fields may be included in the downlink PPDU. However, when a particular field in the downlink PPDU is transmitted in the encoded form on all downlink transmission resources, the CRCs for the respective fields may not be included in the downlink PPDU. Accordingly, CRC overhead may be reduced. That is, the downlink PPDU format for downlink MU transmission according to the embodiment of the present invention may use the HE-SIG B 1345 in the encoded form on all transmission resources, thereby reducing CRC overhead of a downlink frame.

In the downlink PPDU format for downlink MU transmission, the HE-STF 1355 and fields after the HE-STF 1355 may also be encoded based on a different IFFT size from that for fields before the HE-STF 1355. Thus, when the STA receives the HE-SIG A 1335 and the HE-SIG B 1345 and is instructed to receive the downlink PPDU based on the HE-SIG A 1335, the STA may decode the downlink PPDU by changing an FFT size from the HE-STF 1355.

Figure 14:
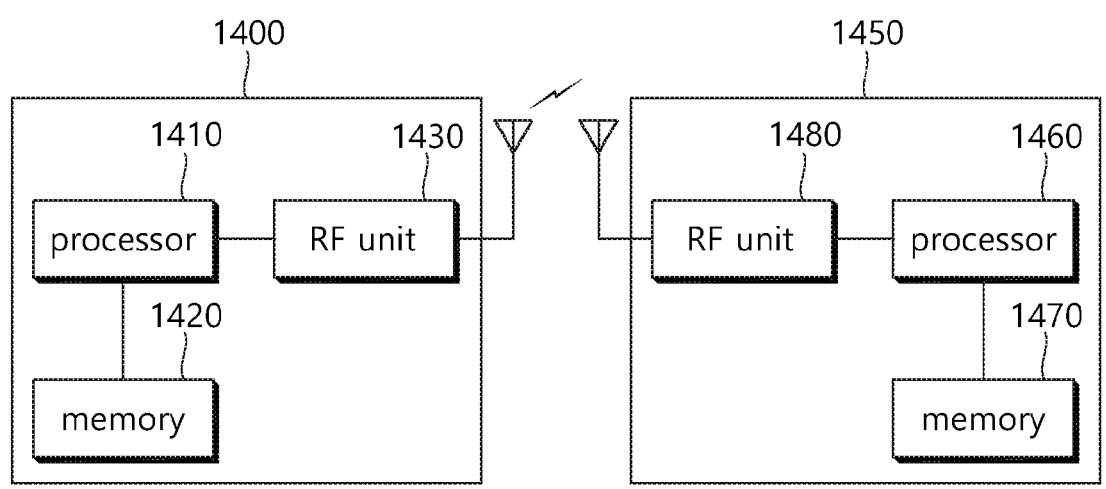
FIG. 14 is a block diagram illustrating a wireless device according to an embodiment of the present invention.

FIG. 14 is a block diagram illustrating a wireless device according to an embodiment of the present invention.

Referring to FIG. 14, the wireless device 800 may be an STA to implement the foregoing embodiments, which may be an AP 1400 or a non-AP STA (or STA) 1450.

The AP 1400 includes a processor 1410, a memory 1420, and a radio frequency (RF) unit 1430.

The RF unit 1430 may be connected to the processor 1410 to transmit/receive a radio signal.

The processor 1410 may implement functions, processes and/or methods suggested in the present invention. For example, the processor 1410 may be configured to perform operations of a wireless device according to the foregoing embodiments of the present invention. The processor may perform operations of a wireless device illustrated in the embodiments of FIGS. 2 to 13.

For example, the processor 1410 may be configured to include information on a listen window in an association response frame transmitted to an STA. Further, the processor 1410 may be configured to include information on an ID indicating a bacon frame time resource.

The processor may be configured to transmit a downlink frame to the STA in the listen window including a monitoring start time resource determined based on the information on the ID indicating the bacon frame time resource and information on the length of the listen window of the STA.

The STA 1450 includes a processor 1460, a memory 1470, and an RF unit 1480.

The RF unit 1480 may be connected to the processor 1460 to transmit/receive a radio signal.

The processor 1460 may implement functions, processes and/or methods suggested in the present invention. For example, the processor 1460 may be configured to perform operations of a wireless device according to the foregoing embodiments of the present invention. The processor may perform operations of a wireless device illustrated in the embodiments of FIGS. 2 to 13.

For example, the processor 1460 may be configured to receive a beacon frame from an AP on a beacon frame time resource for the beacon frame and to maintain the sleep mode until a monitoring start time resource for a downlink frame carrying downlink data after receiving the beacon frame. Further, the processor 1460 may be configured to receive the downlink frame from the AP in a listen window including the monitoring start time resource.

A TIM included in the beacon frame may indicate the downlink data, the monitoring start time resource may be determined based on an ID indicating the beacon frame time resource and the length of the listen window, and the listen window may be a downlink frame monitoring period of the STA.

The processors 1410 and 1460 may include an application-specific integrated circuit (ASIC), other chipsets, a logic circuit, a data processor and/or a converter to convert a baseband signal and a radio signal from one to the other. The memories 1420 and 1470 may include a read-only memory (ROM), a random access memory (RAM), a flash memory, a memory card, a storage medium and/or other storage devices. The RF units 1430 and 1480 may include at least one antenna to transmit and/or receive a radio signal.

When the embodiments are implemented with software, the foregoing techniques may be implemented by a module (process, function, or the like) for performing the foregoing functions. The module may be stored in the memories 1420 and 1470 and be executed by the processors 1410 and 1460. The memories 1420 and 14570 may be disposed inside or outside the processors 1410 and 1460 or be connected to the processors 1410 and 1460 via various well-known means.

What is claimed is:

1. An operation method based on a power saving mode in a wireless local area network (WLAN), the method comprising:
   receiving, by a station (STA), a beacon frame from an access point (AP) on a beacon frame time resource for transmission of the beacon frame determined based on a listen interval, a time indication map (TIM) comprised in the beacon frame indicating pending downlink data for the STA;
   maintaining, by the STA, a sleep mode until a monitoring start time resource for a downlink frame carrying the downlink data after receiving the beacon frame; and
   receiving, by the STA, the downlink frame from the AP in a listen window comprising the monitoring start time resource,
   wherein the monitoring start time resource is determined based on an identifier indicating the beacon frame time resource and a length of the listen window, and
   the listen window is a downlink frame monitoring period of the STA.

2. The method of claim 1, wherein information on the listen window is comprised in an association response frame transmitted by the AP to the STA.

3. The method of claim 1, wherein the beacon frame comprises information on the identifier indicating the beacon frame time resource.

4. The method of claim 1, wherein the identifier indicating the beacon frame time resource is a first identification number for a time unit in which the beacon frame is transmitted,
   the length of the listen window is a number of time units comprised in the listen window,
   the monitoring start time resource is a time resource corresponding to a second identification number after addition of the first identification number and a value resulting from an modulo operation, and
   the value resulting from the modulo operation is (the first identification number) mod (the number of time units).

5. The method of claim 1, wherein information on the listen interval is comprised in an association request frame transmitted by the STA, and
   information on the listen window is comprised in an association response frame transmitted in response to the association request frame.

6. A station (STA) operating based on a power saving mode in a wireless local area network (WLAN), the STA comprising:
   a radio frequency (RF) unit configured to transmit or receive a radio signal; and
   a processor operatively connected to the RF unit,
   wherein the processor is configured to receive a beacon frame from an access point (AP) on a beacon frame time resource for transmission of the beacon frame determined based on a listen interval, to maintain a sleep mode until a monitoring start time resource for a downlink frame carrying downlink data after receiving the beacon frame, and to receive the downlink frame from the AP in a listen window comprising the monitoring start time resource,
   a time indication map (TIM) comprised in the beacon frame indicates the downlink data,
   the monitoring start time resource is determined based on an identifier indicating the beacon frame time resource and a length of the listen window, and
   the listen window is a downlink frame monitoring period of the STA.

7. The STA of claim 6, wherein information on the listen window is comprised in an association response frame transmitted by the AP to the STA.

8. The STA of claim 6, wherein the beacon frame comprises information on the identifier indicating the beacon frame time resource.

9. The STA of claim 6, wherein the identifier indicating the beacon frame time resource is a first identification number for a time unit in which the beacon frame is transmitted,
   the length of the listen window is a number of time units comprised in the listen window,
   the monitoring start time resource is a time resource corresponding to a second identification number after addition of the first identification number and a value resulting from an modulo operation, and
   the value resulting from the modulo operation is (the first identification number) mod (the number of time units).

10. The STA of claim 6, wherein information on the listen interval is comprised in an association request frame transmitted by the STA, and
information on the listen window is comprised in an association response frame transmitted in response to the association request frame.

\* \* \* \* \*